US012496988B2

(12) United States Patent
Peterson et al.

(10) Patent No.: US 12,496,988 B2
(45) Date of Patent: *Dec. 16, 2025

(54) VEHICLE ELECTRICAL INTERCONNECTION SYSTEM

(71) Applicant: AptiV Technologies Limited, St. Michael (BB)

(72) Inventors: David R. Peterson, Aurora, OH (US); Joseph Sudik, Jr., Niles, OH (US); Jared Bilas, North Bloomfield, OH (US); Kurt P. Seifert, Cortland, OH (US); David G. Siegfried, Warren, OH (US); Lee Bauer, Birmingham, MI (US); Christian Schaefer, Bochum (DE); Magnus Svensson, Gothenburg (SE); Martin Bornemann, Nuremberg (DE)

(73) Assignee: Aptiv Technologies AG, Schaffhausen (CH)

( * ) Notice: Subject to any disclaimer, the term of this patent is extended or adjusted under 35 U.S.C. 154(b) by 319 days.

This patent is subject to a terminal disclaimer.

(21) Appl. No.: 18/308,030

(22) Filed: Apr. 27, 2023

(65) Prior Publication Data

US 2023/0256923 A1     Aug. 17, 2023

Related U.S. Application Data

(63) Continuation of application No. 17/072,658, filed on Oct. 16, 2020, now Pat. No. 11,639,143.

(Continued)

(51) Int. Cl.
*B60R 16/02* (2006.01)
*B60L 50/60* (2019.01)
(Continued)

(52) U.S. Cl.
CPC .......... *B60R 16/0231* (2013.01); *B60L 50/60* (2019.02); *B60L 50/66* (2019.02);
(Continued)

(58) Field of Classification Search
CPC ..... B60R 16/03; B60R 16/0231; B60L 50/60; B60L 50/66; B60L 3/0069; B60L 50/16; B60L 50/52; B60L 50/40; H02K 11/00
(Continued)

(56) References Cited

U.S. PATENT DOCUMENTS 10,137,782 B2 * 11/2018 Iwasaki ................... B60R 16/03
10,730,458 B2 *  8/2020 Specht ................ B60R 16/0207
(Continued)

FOREIGN PATENT DOCUMENTS

DE        19857916 A1   6/2000
DE     102017210766 A1   1/2018
(Continued)

OTHER PUBLICATIONS

Office Action received for EP20203201.7, 6 pages May 21, 2024.
(Continued)

*Primary Examiner* — Roger L Pang
(74) *Attorney, Agent, or Firm* — Miller Johnson

(57) ABSTRACT

Electrified vehicle electrical systems and formatting methods include arranging a first layer including one or more first electrical transmission lines each configured to carry electrical power at a first voltage to one or more electrical powertrain components of the electrified vehicle, arranging a second layer above at least a portion of the first electrical connection layer, wherein the second layer includes one or more second electrical transmission lines each configured to carry electrical power at a second voltage to one or more electrical power distribution components of the electrified vehicle, and arranging a third layer above at least a portion (Continued)

of the first and second layers, wherein the third layer includes one or more third electrical transmission lines each configured to carry electrical power at a third voltage to one or more input/output device components of the electrified vehicle.

13 Claims, 8 Drawing Sheets

Related U.S. Application Data

(60) Provisional application No. 62/925,147, filed on Oct. 23, 2019.

(51) Int. Cl.

| | | |
|---|---|---|
| *B60R 16/023* | (2006.01) | |
| *H02K 7/00* | (2006.01) | |
| *H02K 11/00* | (2016.01) | |
| *B60L 3/00* | (2019.01) | |
| *B60R 16/03* | (2006.01) | |

(52) U.S. Cl.
CPC ......... *H02K 7/006* (2013.01); *H02K 11/0094* (2013.01); *B60L 3/0069* (2013.01); *B60R 16/03* (2013.01)

(58) Field of Classification Search
USPC ............................................ 180/65.1, 65.31
See application file for complete search history.

(56) References Cited

U.S. PATENT DOCUMENTS

| | | | |
|---|---|---|---|
| 10,988,092 B2* | 4/2021 | Takamatsu | H01R 13/64 |
| 11,180,096 B2* | 11/2021 | Paquette | H02K 7/1004 |
| 11,639,143 B2* | 5/2023 | Peterson | H02K 11/0094 |
| | | | 307/10.1 |
| 2003/0030328 A1 | 2/2003 | Tamai et al. | |
| 2004/0070911 A1 | 4/2004 | Tran | |
| 2014/0238735 A1* | 8/2014 | Adachi | H01R 4/20 |
| | | | 174/351 |
| 2018/0345886 A1 | 12/2018 | Tazarine et al. | |
| 2019/0061650 A1 | 2/2019 | Kato | |
| 2019/0217794 A1* | 7/2019 | Chandra | B60R 16/0207 |

FOREIGN PATENT DOCUMENTS

| | | |
|---|---|---|
| DE | 112017000619 | 10/2018 |
| DE | 102014202195 | 9/2020 |
| EP | 3192704 A1 | 7/2017 |
| WO | 2004070911 A1 | 8/2004 |
| WO | 2018087260 A1 | 5/2018 |
| WO | 2018160198 A1 | 9/2018 |
| WO | 2019160147 A1 | 8/2019 |

OTHER PUBLICATIONS

Chinese Office Action received for CN202011146944.1 dated Feb. 25, 2025, 19 pages.
European Search Report dated Mar. 23, 2021. 10 pages.

* cited by examiner

VEHICLE ELECTRICAL INTERCONNECTION SYSTEM

CROSS-REFERENCE TO RELATED APPLICATION(S)

The present application is a continuation of U.S. application Ser. No. 17/072,658, filed on Oct. 16, 2020, which claimed the benefit of U.S. Provisional Application No. 62/925,147, filed on Oct. 23, 2019. The disclosure of the above-identified applications are herein incorporated by reference in their entirety.

FIELD

The present disclosure generally relates to an electrical interconnection system for a vehicle, particularly for a vehicle having multiple separate electrical systems with different operating voltages.

BACKGROUND

Electrified vehicles typically comprise complex electrical systems. This is primarily due to different components having different power requirements. For example, the electrical system could comprise a plurality of electrical subsystems each operating at a different voltage. For example, low voltage components, such as functional devices and sensors, could operate at 12 volts, whereas propulsion systems, such as electric motors, could operate at hundreds of voltages (e.g., 400+ volts). In addition, there are typically one or more controller(s) controlling input/output of the various components of the electrified vehicle. The result is a large, complex electrical system that increases vehicle costs and weight and decreases vehicle packaging availability, while also being very difficult for a human or a robot to install/modify. Thus, while these conventional electrical systems work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an electrical system for an electrified vehicle is presented. In one exemplary implementation, the electrical system comprises a first electrical connection layer arranged upon a base of an electrified vehicle and comprising one or more first electrical transmission lines each connected to a first electrical power source of the electrified vehicle and each configured to carry electrical power at a first voltage to one or more electrical powertrain components of the electrified vehicle, a second electrical connection layer arranged above at least a portion of the first electrical connection layer and comprising one or more second electrical transmission lines each connected to a second electrical power source and each configured to carry electrical power at a second voltage to one or more electrical power distribution components of the electrified vehicle, and a third electrical connection layer arranged above at least a portion of the first and second electrical connection layers and comprising one or more third electrical transmission lines each connected to a third power source and each configured to carry electrical power at a third voltage to one or more input/output device components of the electrified vehicle.

In some implementations, the second voltage is less than the first voltage and the third voltage is less than or equal to the second voltage. In some implementations, the first voltage is greater than 60 volts and wherein the third voltage is selected from the group consisting of 48 volts, 24 volts, 12 volts, 5 volts, and 3.3 volts. In some implementations, the at least one electrical powertrain component is an electric traction motor configured to propulsion of the electrified vehicle, and the at least one first electrical transmission line a rigid busbar arranged substantially parallel to a length of the electrified vehicle, and the first voltage is sufficient for powering the electric traction motor In some implementations, the first electrical power source is a battery system of the vehicle that is also arranged upon the base of the electrified vehicle. In some implementations, the electrified vehicle further comprises a vehicle body arranged above the first electrical connection layer, and wherein the second and third electrical connection layers are arranged upon the vehicle body. In some implementations, the electrical system defines at least two zones corresponding to outlying sides or corners of the electrified vehicle. and wherein the electrical system further comprises zone controllers for the zones, respectively, wherein each zone controller is configured to control input/output from/to functional devices and sensors associated with the respective zone of the electrified vehicle.

In some implementations, the electrical system further comprises a chassis/body controller configured to control one or more vehicle body accessory devices, and a gateway controller configured to control data transmission to/from the electrified vehicle via one or more networks. In some implementations, the electrical system further comprises at least one server platform controller configured for high-level processing for control of the electrified vehicle. In some implementations, one or more of the second electrical transmission lines of the second layer is configured to carry data to one or more controllers of the electrified vehicle.

According to another aspect of the present disclosure, a method of forming or installing an electrical system for an electrified vehicle is presented. In one exemplary implementation, the method comprises arranging a first electrical connection layer upon a base of an electrified vehicle, wherein the first electrical connection layer comprises one or more first electrical transmission lines each connected to a first electrical power source of the electrified vehicle and each configured to carry electrical power at a first voltage to one or more electrical powertrain components of the electrified vehicle, arranging a second electrical connection layer above at least a portion of the first electrical connection layer, wherein the second electrical connection layer comprises one or more second electrical transmission lines each connected to a second electrical power source and each configured to carry electrical power at a second voltage to one or more electrical power distribution components of the electrified vehicle, and arranging a third electrical connection layer above at least a portion of the first and second electrical connection layers, wherein the third electrical connection layer comprises one or more third electrical transmission lines each connected to a third power source and each configured to carry electrical power at a third voltage to one or more input/output device components of the electrified vehicle.

In some implementations, the second voltage is less than the first voltage and the third voltage is less than or equal to the second voltage. In some implementations, the first voltage is greater than 60 volts and wherein the third voltage is selected from the group consisting of 48 volts, 24 volts, 12 volts, 5 volts, and 3.3 volts. In some implementations, the at least one electrical powertrain component is an electric traction motor configured to propulsion of the electrified vehicle, the at least one first electrical transmission line a rigid busbar arranged substantially parallel to a length of the electrified vehicle, and the first voltage is sufficient for powering the electric traction motor In some implementations, the first electrical power source is a battery system of the vehicle that is also arranged upon the base of the electrified vehicle. In some implementations, the electrified vehicle further comprises a vehicle body arranged above the first electrical connection layer, and wherein the second and third electrical connection layers are arranged upon the vehicle body. In some implementations, the electrical system defines at least two zones corresponding to outlying sides or corners of the electrified vehicle. and wherein the method further comprises arranging zone controllers for the zones, respectively, wherein each zone controller is configured to control input/output from/to functional devices and sensors associated with the respective zone of the electrified vehicle.

In some implementations, the method further comprises arranging a chassis/body controller configured to control one or more vehicle body accessory devices, and arranging a gateway controller configured to control data transmission to/from the electrified vehicle via one or more networks. In some implementations, the method further comprises arranging at least one server platform controller configured for high-level processing for control of the electrified vehicle. In some implementations, one or more of the second electrical transmission lines of the second layer is configured to carry data to one or more controllers of the electrified vehicle. In some implementations, the arranging of the first, second, and third electrical connection layers is performed by a robotic installer.

According to yet another aspect of the present disclosure, an electrical system for an electrified vehicle is presented. In one exemplary implementation, the electrical system comprises a first electrical connection layer arranged upon a base of an electrified vehicle and comprising one or more first electrical transmission lines each connected to a first electrical power source of the electrified vehicle and each configured to carry electrical power at a first voltage to one or more electrical powertrain components of the electrified vehicle, a second electrical connection layer arranged above at least a portion of the first electrical connection layer and comprising one or more second electrical transmission lines each connected to a second electrical power source and each configured to carry electrical power at a second voltage to one or more electrical power distribution components of the electrified vehicle and data to one or more controllers of the electrified vehicle, a third electrical connection layer arranged above at least a portion of the first and second electrical connection layers and comprising one or more third electrical transmission lines each connected to a third power source and each configured to carry electrical power at a third voltage to one or more input/output device components of the electrified vehicle, at least two zone controllers for zones corresponding to outlying sides or corners of the electrified vehicle, respectively, wherein each zone controller is configured to control input/output from/to functional devices and sensors associated with the respective zone of the electrified vehicle, a chassis/body controller configured to control one or more vehicle body accessory devices, a gateway controller configured to control data transmission to/from the electrified vehicle via one or more networks, and at least one server platform controller configured for high-level processing for control of the electrified vehicle.

In some implementations, the electrical system comprises two server platform controllers for increased redundancy.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
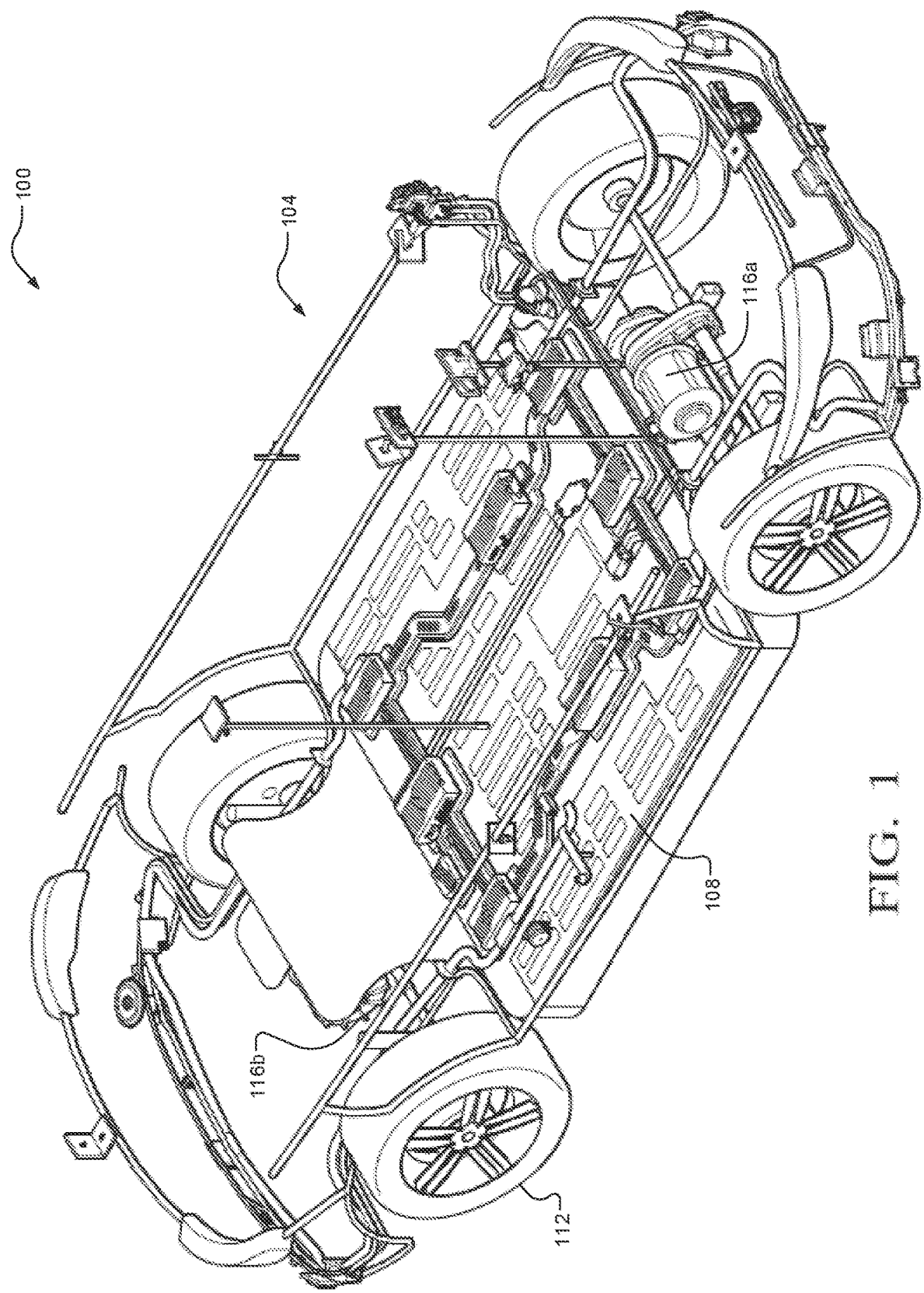
FIG. 1 is a perspective view of an example electrical system for an electrified vehicle according to some implementations of the present disclosure.
Figure 2:
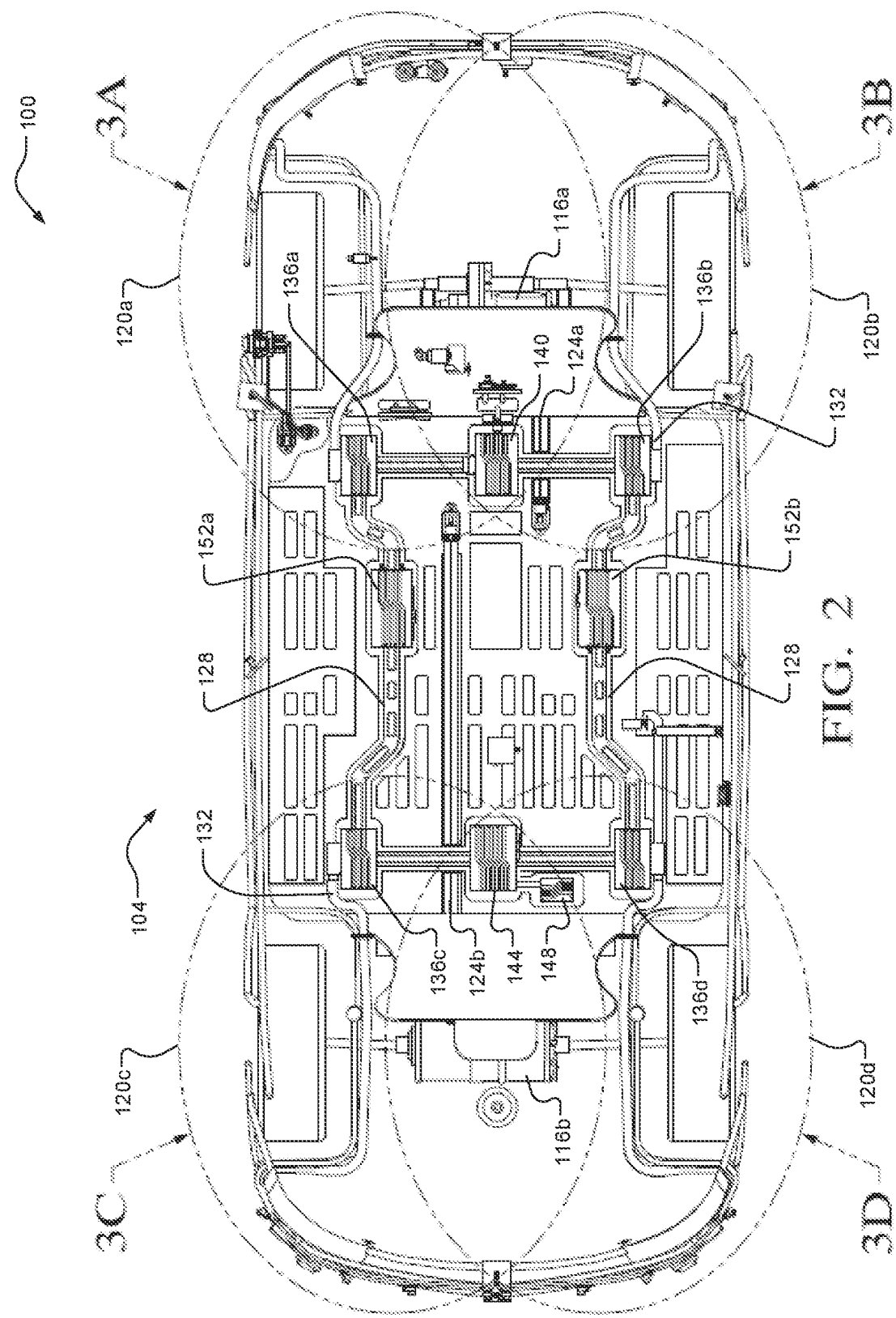
FIG. 2 is an overhead view of the example electrical system of FIG. 1 identifying four zones of the electrical system of the electrified vehicle according to some implementations of the present disclosure.
Figure 3A:
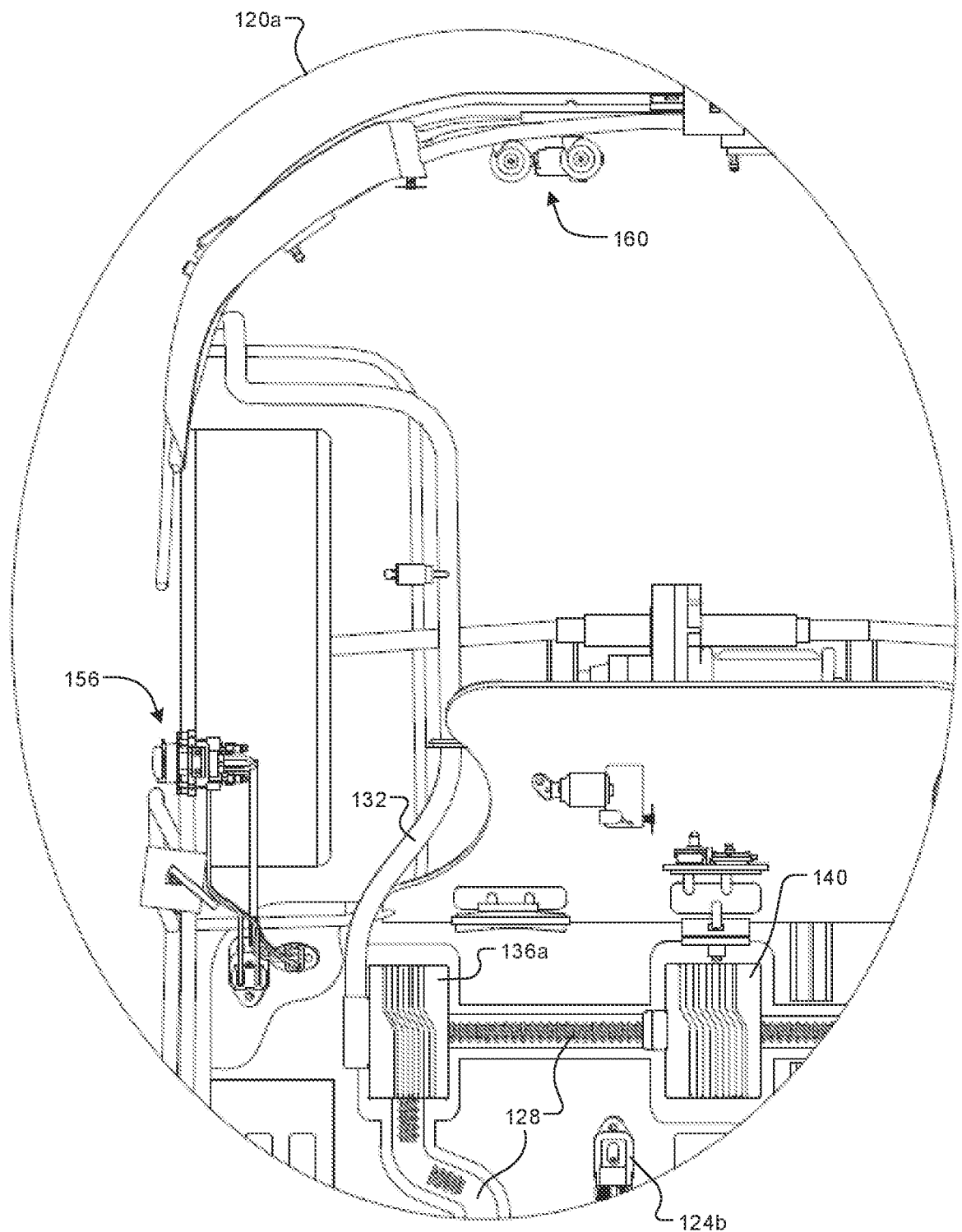
FIGS. 3A-3D are zoomed-in views of the four zones of the electrical system of the electrified vehicle according to some implementations of the present disclosure.
Figure 3B:
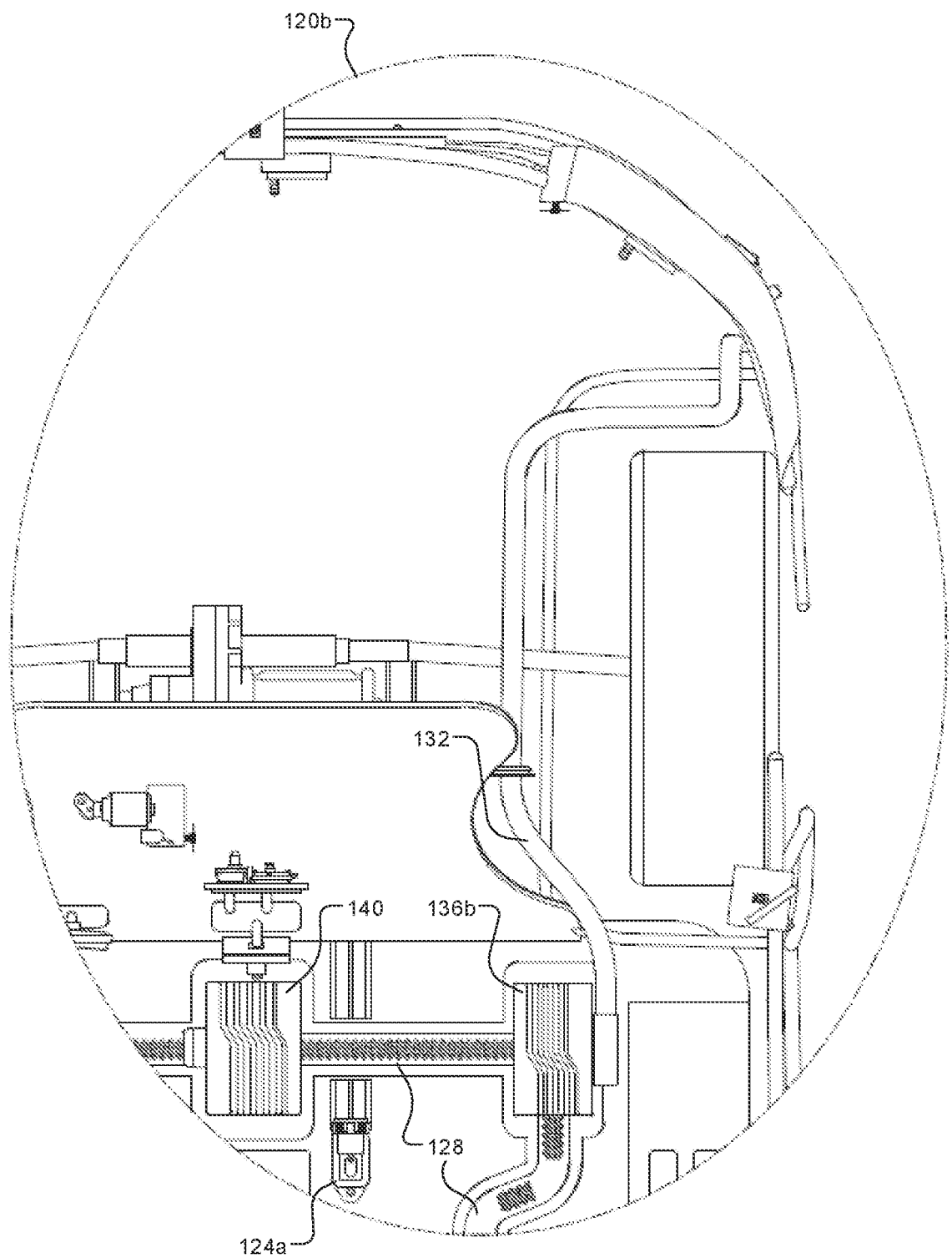
Figure 3C:
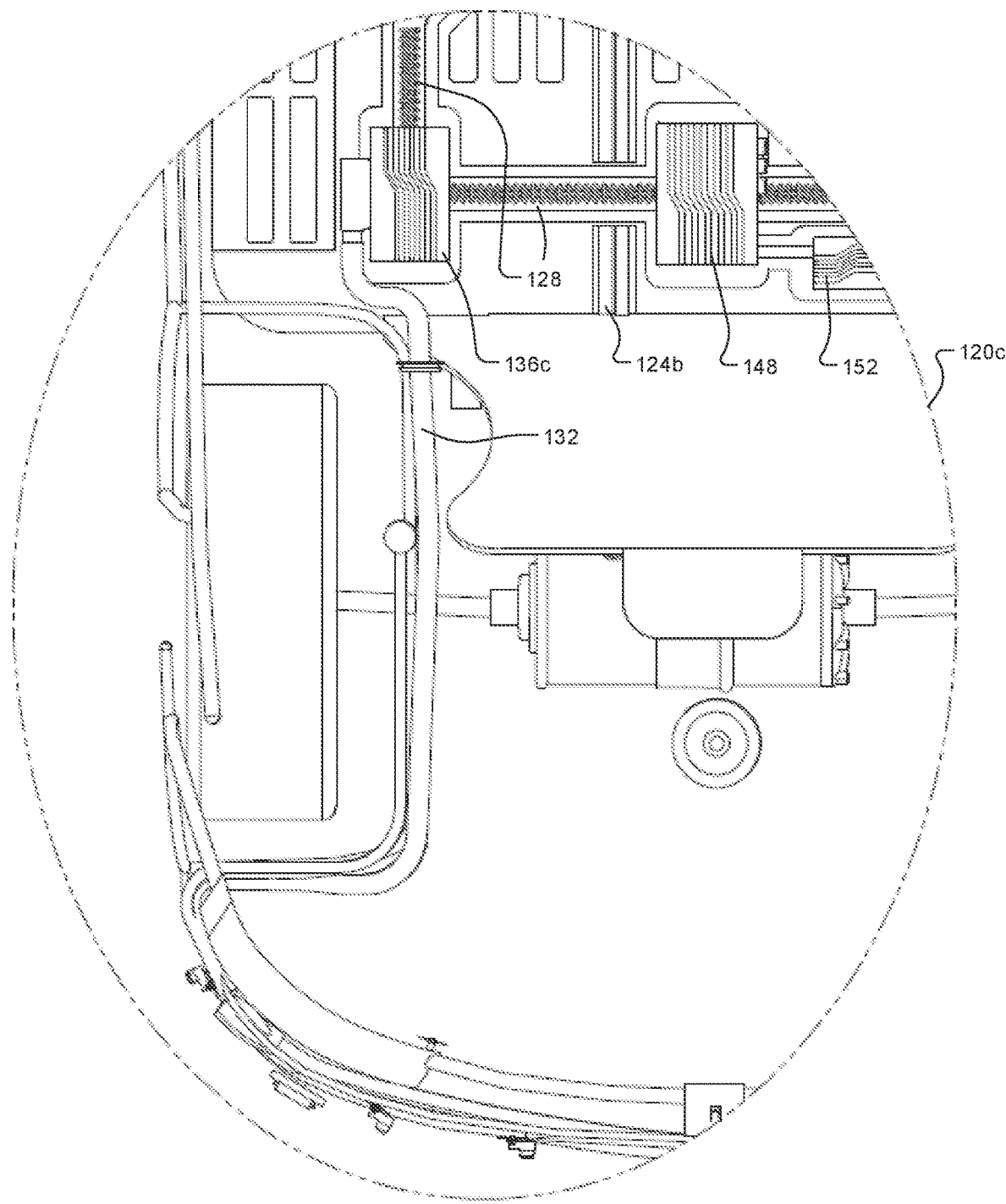
Figure 3D:
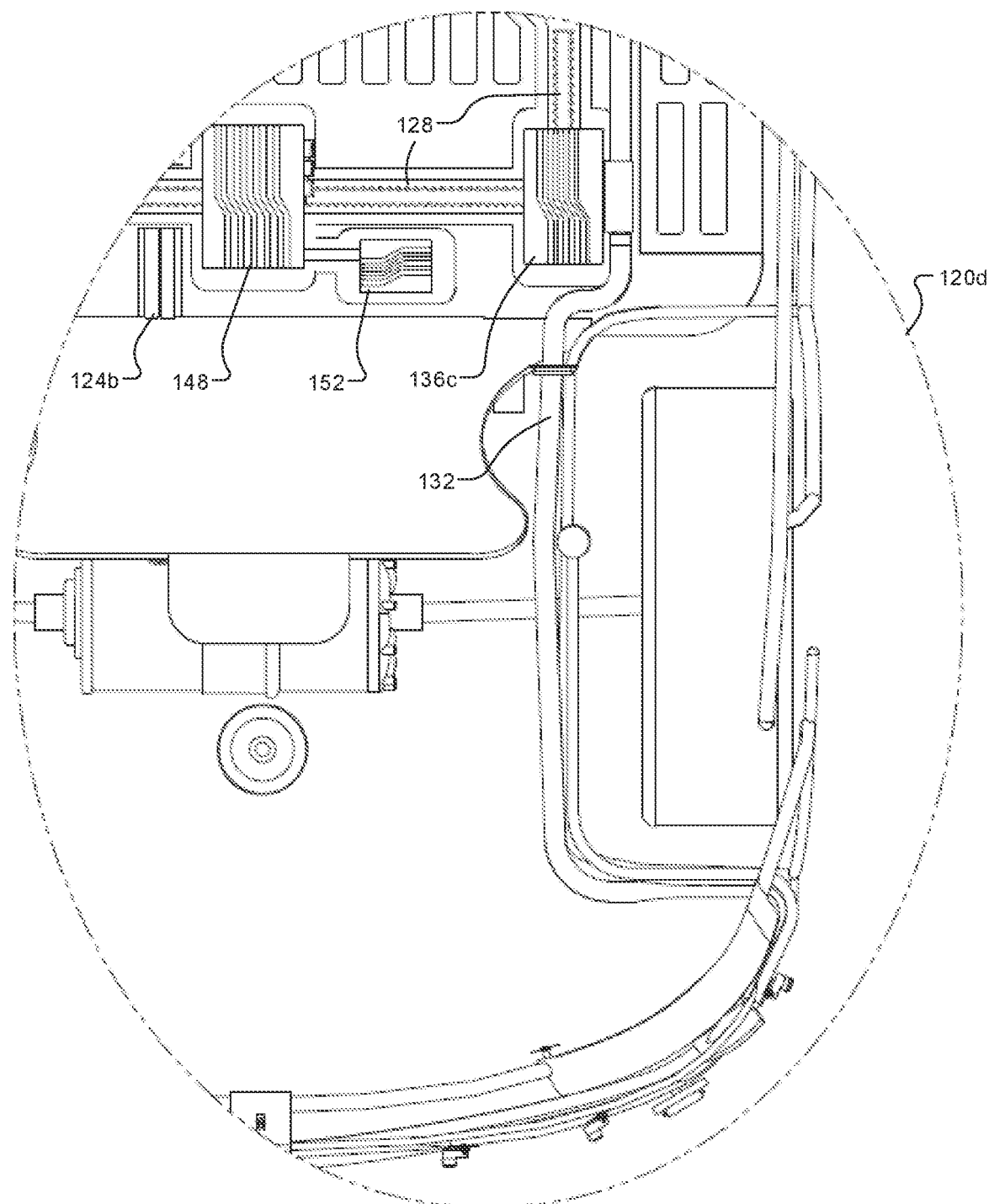

As previously discussed, conventional electrified vehicle electrical systems are large and complex, which increases vehicle costs and weight and decreases vehicle packaging availability. In addition, these conventional electrical systems are very difficult for a human or a robot to install/modify. Accordingly, improved vehicle electrical interconnection systems and methods of formation/installation are presented herein. The electrical system can generally be divided into three distinct sub-systems: a propulsion power system, a power distribution system, and vehicle zone systems. The propulsion power system provides power from the vehicle's battery pack(s) to a propulsion motor(s) in the electrified vehicle (battery electric vehicle (BEV), a hybrid electric vehicle (HEV), etc.). The power distribution system provides electrical power from the battery pack(s), typically at a lower voltage, to multiple vehicle zone systems that supply electrical power to various electrical devices in the vehicle such as motors, lights, and sensors at the voltage required by those devices. It will be appreciated that the term "power distribution system" as used herein could also be referred to as "a power and signal distribution system" as this system could also carry data signals.

Referring now to FIGS. 1, 2, and 3A-3C, various views of an electrified vehicle 100 having an example electrical system 104 according to some implementations of the present disclosure are illustrated. The electrified vehicle 100 comprises a base or body 108, four wheels 112, and at least one electric motor (e.g., electric traction motors), with two electric traction motors 116a, 116b being illustrated. As previously mentioned, the electrical system 104 can generally be divided into three sub-systems: a propulsion power system, a power distribution system, and vehicle zone systems. The propulsion power system, also referred to as a "first electrical connection layer" and shown at 124a, 124b, includes metallic conductors that distribute electrical power and provide a ground from battery pack(s) to the motor(s). The conductors are designed to specific dimensions and may be designed to be rigid, e.g. a bus bar, in some areas and flexible in others, thereby allowing the conductors to provide a contoured fit to vehicle surfaces, particularly to the contour of the battery pack(s) and motor(s). Thick, rigid busbar configurations could be required for high power/current distribution (e.g., 60 or more volts, including as high as 400+ volts). The combination of rigid and flexible portions of the propulsion power system may aid robotic installation and robotically aligned electrical connection. These conductors are terminated by electrically conductive connectors, e.g. a male blade or other terminal type, that are affixed, e.g. by welding or crimping to the conductor. The propulsion power system may also contain insulative connector covers to prevent contact with energized connectors or conductors. The connectors and connector covers preferably include alignment and handling features to facilitate robotic connection of the connectors and connector covers to a vehicle component, e.g. a motor or battery pack. Alignment and handling features suitable for use with a robot are incorporated into the conductors or added to the conductors in the form of channels, clips, attachments, etc. The conductors, connectors, and connector covers are preferably designed to facilitate an automated robotic "top down" installation process. As used herein, a top down installation process describes assembling a second system, e.g. the power distribution system, onto a previously installed device, e.g. the propulsion power system, preferably along the Z-axis as defined by Society of Automotive Engineers (SAE) Standard J670.

Figure 4:
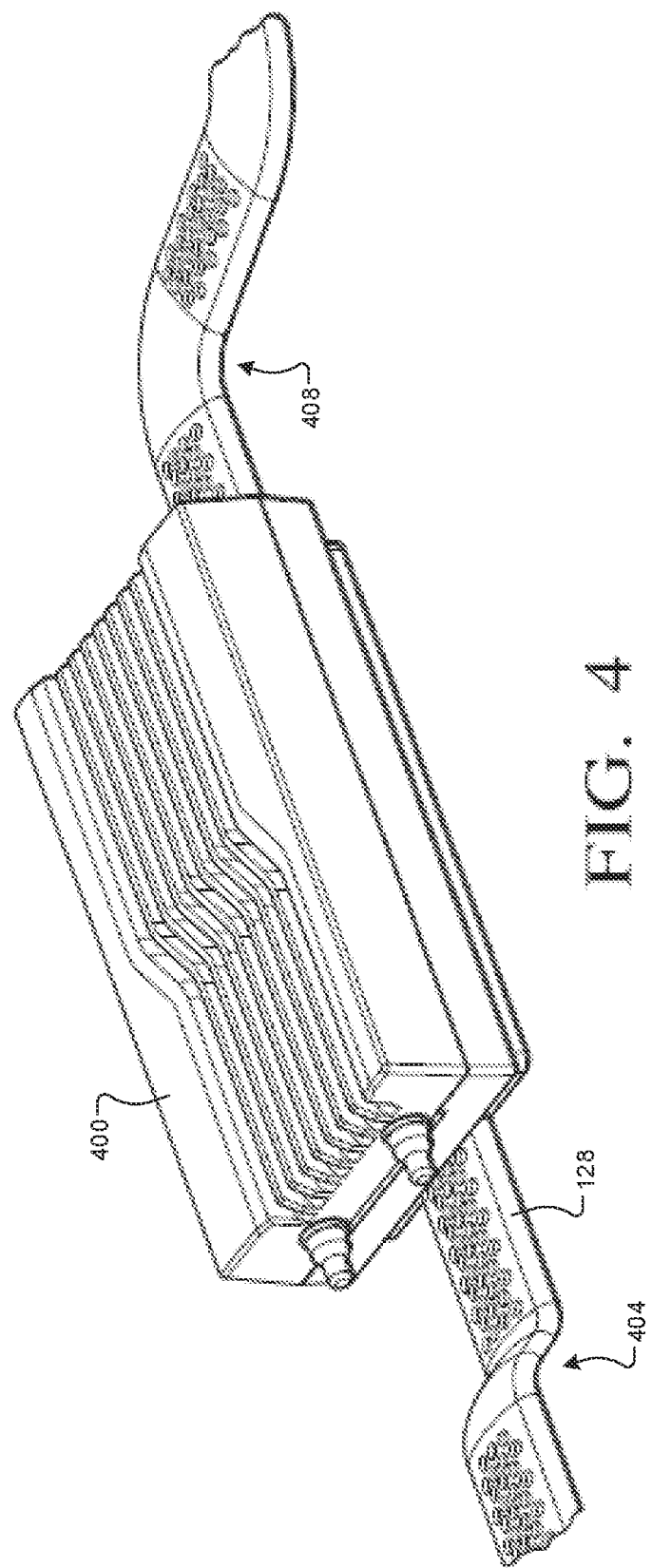
FIG. 4 is a zoomed-in view of one of an example controller and associated example electrical connection layers according to some implementations of the present disclosure.

The power distribution system, also referred to as a "second electrical connection layer" and shown at 128, includes metallic power circuits to provide electrical power and provide a ground to various control modules and other devices within the vehicle 100. The power distribution system also includes metallic data circuits to transmit signals to/from the various control modules and other devices, such as voltage converters (e.g., DC-DC converters). Dielectric and adhesive materials may be laminated to the power and data circuits to insulate and/or shield the power and data circuits. The power and data circuits may be incorporated into flexible circuits ("FCs," such as a flexible printed circuit, or "FPC") that are designed to be contoured to the shape of sheet metal of the vehicle body along X, Y, and Z axes of the vehicle 100 per SAE Standard J670. Alignment and robotic handling features may be designed into the FC or may be incorporated as added components (channels, clips, attachments, etc.) These features can also be designed to improve flexibility or rigidity in specific areas of the FC. Additional wires may be "piggy backed" to the FC as needed. Longitudinal features, e.g. perforations may be integrated into FC assembly to facilitate bending or folding of the FC, thereby allowing improved installation characteristics of the power distribution system into the vehicle 100. FIG. 4, for example, illustrates an example controller 400 having the second electrical connection layer 128 therealong and having both a step-down feature 404 and a curve feature 408. The FC may be cut to required length and insulation and/or adhesive is selectively removed at electrical connection points. Electrical connections are facilitated using welded or pressure contact terminals and positioned in a connector. To facilitate robotic installation of the power distribution system into the vehicle 100, the connectors are designed to be collated in a holder that controls required connection orientation allowing a robotic top down installation method. The power distribution system includes connector holders that are fixed into the vehicle 100 using snap-fit or other features. The connector holders may have integral alignment features, thereby allowing the mating of the power distribution system with control modules containing voltage convertor circuitry or other devices connecting the power distribution system to the propulsion power system to be performed robotically using the top down installation method. The FC and connector assemblies of the power distribution system can be installed individually or as multiple assemblies that are pre-assembled and installed into the vehicle 100 as a single unit.

The power distribution system is interconnected with the vehicle zone systems (see four corner zones 120a-120d) via power data center(s) (PDCs) or "zone controllers" as shown at 136a-136d that contain voltage convertor circuitry to convert the voltage of the power distribution system to the voltage required by devices (actuators 156, sensors 160, etc.) interconnected to the vehicle zone system. While four zones are shown and described herein, it will be appreciated that there could be two zones (e.g., front/rear or front left/front right) or three zones (e.g., front left/front right/rear) or more than four zones. The PDCs also contain control logic to control the various devices connected to the vehicle zone system based on data transmitted via the power distribution system. The PDCs may also contain data gateways to control the flow of data between devices connected to the vehicle zone system and the power distribution system. It will be appreciated that each zone can have a plurality of actuators and/or sensors associated therewith, including, but not limited to, motorized devices (speakers, locks, motorized controls for doors/windows/mirrors, etc.) and sensors (RADAR, LIDAR, camera(s), etc.). There may be one PDC for each vehicle zone system in the vehicle 100. The connector system between the PDC and the power distribution system may be designed to facilitate an automated "dock and lock" assembly method. The "dock and lock" connection system is designed to self-align using lead in pins with a floating connector holder to support robotic assembly of the PCB with the power distribution system. Each vehicle zone system includes metallic lower voltage power circuits, also referred to as "a third electrical connection layer" and shown at 132, to provide electrical power and provide a ground to the devices 156, 160 within a zone the vehicle 100. As used herein "lower voltage" means lower than the operating voltage of the power distribution system. This could include, for example only, a voltage selected from the group consisting of 48 volts, 24 volts, 12 volts, 5 volts, and 3.3 volts. It will also be appreciated that this lower voltage could be an even lower voltage, such as devices/sensors advance over time. The vehicle zone system also includes metallic zone data circuits to transmit data between the PDC and the devices within the zone. The electrical system of the vehicle 100 may be divided into several zones, such as left front quadrant 120a, right front quadrant 120b, left rear quadrant 120c, and right rear quadrant 120d. Laminated dielectric and adhesive materials may be used to insulate or shield the lower voltage power circuits and zone data circuits. It will be appreciated that at least a portion of the third electrical connection layer 132 or another (e.g., a fourth electrical connection layer) could also be arranged atop the second electrical connection layer 128.

The lower voltage power circuits and zone data circuits may be incorporated into FCs that are designed to be contoured to the shape of sheet metal and to accommodate layout of other vehicle components and devices along the X, Y, and Z axes of the vehicle 100. Alignment and robotic handling features may be designed into the FC or may be incorporated as added components (channels, clips, attachments, etc.) These features can also be designed to improve flexibility or rigidity in specific areas of the FC. Additional wires may be "piggy backed" to the FC as needed. Longitudinal features, e.g. slits, may be integrated into FC assembly to singulate circuits and/or facilitate bending or folding of the FC, thereby allowing improved installation characteristics of the power distribution system into the vehicle 100. The FC may be cut to required length and insulation and/or adhesive is selectively removed at electrical connection points. Electrical connections are facilitated pressure contact terminals preloaded in connectors and positioned/fixed onto the FC. To facilitate robotic installation, connectors are designed to be collated in a holder for precise location. Each connector is designed to be manipulated with a robotic end effector for device connection. The connector holder can be designed as dunnage secured to a PDC with connections from the FC assembly (non-device) already completed.

In addition to the zone controllers 136a-136d, the electrical system 104 could include a plurality of other controllers. For example, a chassis/body controller 144 could be connected in a front-central portion of the electrical system 104 and configured to control one or more vehicle body accessory devices (power windows, power mirrors, air conditioning, an immobilization system (seatbelts, airbags, etc.), central locking, and the like. Also for example, a gateway controller 148 having an associated network module or transceiver 152 could be connected in a read-central portion of the electrical system and configured to control data transmission to/from the electrified vehicle 100 via one or more networks (GPS, cellular, etc.). Further for example, one or more server platform controllers 152a, 152b could be arranged towards between at least one of (i) the front left and rear left zones 120a, 120c and (ii) the front right and rear right zones 120b, 120d and configured for high-level processing for control of the electrified vehicle 100. These server platform controllers 152a, 152b are configured to handle the highest level processing in the electrified vehicle, such as executing machine learning algorithms as part of ADAS or autonomous driving functions of the electrified vehicle 100. As shown, there are two server platform controllers 152a, 152b to improve redundancy (e.g., output checking/comparison) and also to cover the event of a single controller malfunction or failure. It will be appreciated that these locations for the chassis/body controller 144, the gateway controller 148, and the server platform controller(s) are merely examples and that there could be other suitable positioning and/or combining of multiple controllers into a single controller.

Figure 5:
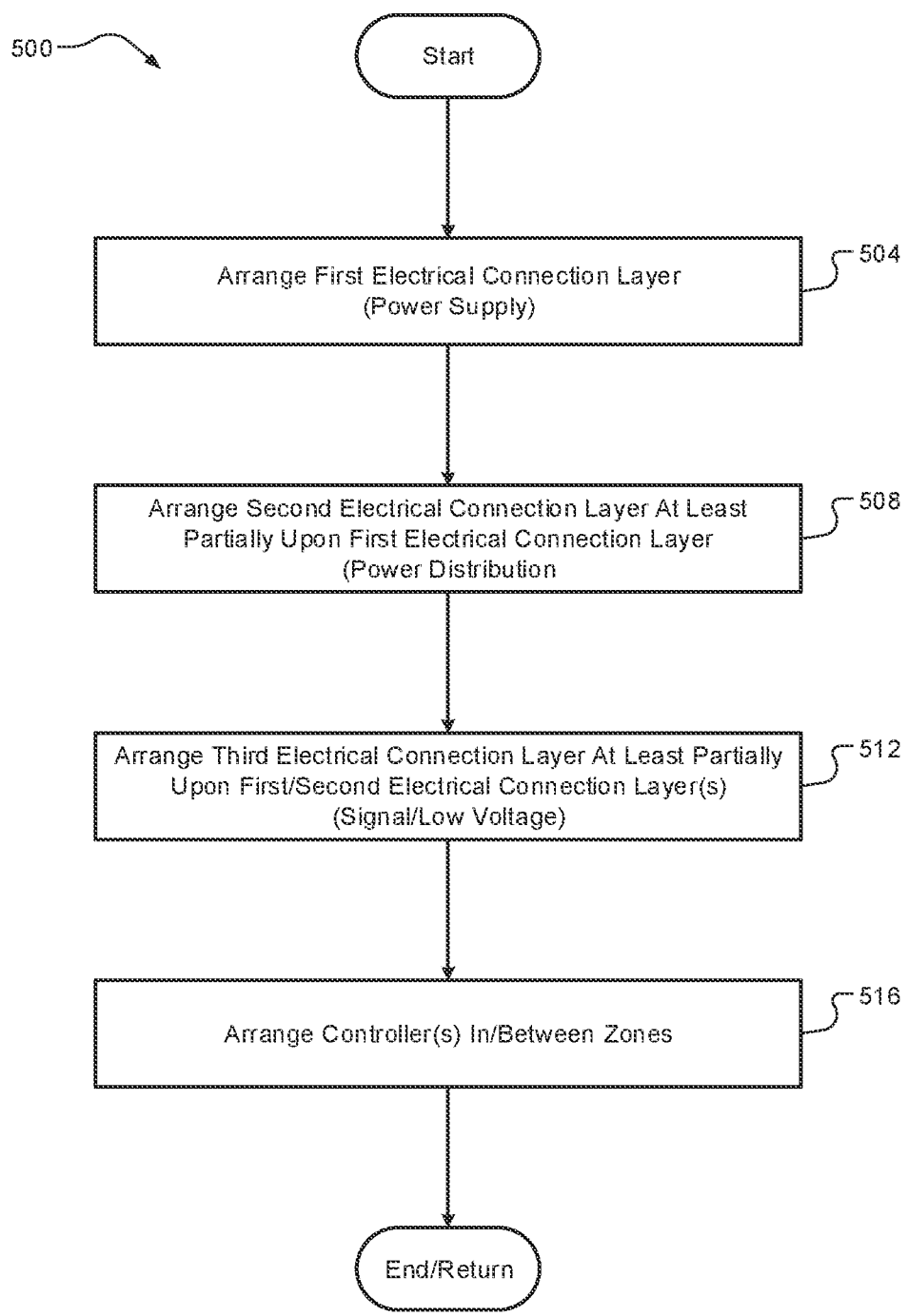
FIG. 5 is a flow diagram of an example method of forming or installing an electrical system for an electrified vehicle according to some implementations of the present disclosure.

Referring now to FIG. 5, a method 500 of forming or installing the electrical system 104 for the electrified vehicle 100 is also presented. The method 500 includes the step 504 of arranging a first electrical connection layer, e.g. the propulsion power system, upon the base 108, which could also have the battery pack(s) and/or the motor(s) 116a, 116b arranged thereon. The first electrical connection layer includes at least one high power electrical transmission line that carries electrical energy between an electrical power source, e.g. the battery pack, and an electrical powertrain component, e.g. the motor, associated with the automotive assembly. The method also includes the step 508 of arranging a second electrical connection layer, e.g. the power distribution system, above the first electrical connection layer. The second electrical connection layer includes at least one high voltage electrical transmission line that carries electrical power for purposes of distribution to one or more components associated with the automotive assembly. The method further includes the step 512 of arranging a third electrical connection layer, e.g. the vehicle zone system, above the first electrical connection layer and the second electrical connection layer, wherein the third electrical connection layer includes at least one electrical transmission line configured to carry electrical power for purposes of supplying one or devices associated with the automotive assembly with electrical power for operation. One or more of the steps of arranging the first electrical connection layer, the second electrical connection layer, and the third electrical connection layer may be performed utilizing a robotic assembly process. The step of arranging the first electrical connection layer may include arranging the first electrical connection layer upon the base 108. The base 108 includes at least one battery surface associated with the vehicle 100. The first electrical connection layer may include a first surface with a contour sized, shaped, and arranged to conform to an upper surface of the base. The method may also include the step of arranging a vehicle body above the first electrical connection layer after the first electrical connection layer is arranged upon the base. The step of arranging the second electrical connection layer above the first electrical connection layer may include arranging the second electrical layer upon at least one surface of the vehicle body. The second electrical connection layer may have at least one surface with a contour sized, shaped, and arranged to conform to the at least one surface of the vehicle body. Lastly, the method 500 may also include the step 516 of arranging some or all of the controllers described herein within the electrical system 104 of the electrified vehicle 100.

While this disclosure has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the disclosure without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the disclosure should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

What is claimed is:

1. An electrical system for an electrified vehicle, the electrical system comprising:
    a first electrical connection layer arranged upon a base of an electrified vehicle and including one or more first electrical transmission lines each configured to carry electrical power at a first voltage to one or more electrical powertrain components of the electrified vehicle, wherein the first voltage is greater than 60 volts;
    a second electrical connection layer arranged above at least a portion of the first electrical connection layer and including one or more second electrical transmission lines each configured to carry electrical power at a second voltage to one or more electrical power distribution components of the electrified vehicle, wherein the second voltage is less than the first voltage; and
    a third electrical connection layer arranged above at least a portion of the first and second electrical connection layers and including one or more third electrical transmission lines each configured to carry electrical power at a third voltage to one or more input/output device components of the electrified vehicle,
    wherein the third voltage is less than or equal to the second voltage, and
    wherein the third voltage is selected from the group consisting of 48 volts, 24 volts, 12 volts, 5 volts, and 3.3 volts.

2. The electrical system of claim 1, wherein the one or more first electrical transmission lines are each connected to a first electrical power source configured to output the first voltage.

3. The electrical system of claim 2, wherein the first electrical power source is a battery system of the vehicle that is also arranged upon the base of the electrified vehicle.

4. The electrical system of claim 3, wherein:
    at least one electrical powertrain component is an electric traction motor configured to propulsion of the electrified vehicle;
    at least one first electrical transmission line includes a rigid busbar arranged substantially parallel to a length of the electrified vehicle; and
    the first voltage is sufficient for powering the electric traction motor.

5. The electrical system of claim 4, wherein the electrified vehicle further includes a vehicle body arranged above the first electrical connection layer, and wherein the second and third electrical connection layers are arranged upon the vehicle body.

6. The electrical system of claim 1, wherein the electrical system defines at least two zones corresponding to outlying sides or corners of the electrified vehicle, and wherein the electrical system further includes zone controllers for the zones, respectively, wherein each zone controller is configured to control input/output from/to functional devices and sensors associated with the respective zone of the electrified vehicle.

7. The electrical system of claim 1, wherein one or more of the second electrical transmission lines of the second layer is configured to carry data to one or more controllers of the electrified vehicle.

8. A method of forming or installing an electrical system for an electrified vehicle, the method comprising:
    arranging a first electrical connection layer upon a base of an electrified vehicle, wherein the first electrical connection layer includes one or more first electrical transmission lines configured to carry electrical power at a first voltage to one or more electrical powertrain components of the electrified vehicle, and wherein the first voltage is greater than 60 volts;
    arranging a second electrical connection layer above at least a portion of the first electrical connection layer, wherein the second electrical connection layer includes one or more second electrical transmission lines each configured to carry electrical power at a second voltage to one or more electrical power distribution components of the electrified vehicle; and
    arranging a third electrical connection layer above at least a portion of the first and second electrical connection layers, wherein the third electrical connection layer includes one or more third electrical transmission lines each configured to carry electrical power at a third voltage to one or more input/output device components of the electrified vehicle, and wherein the third voltage is selected from the group consisting of 48 volts, 24 volts, 12 volts, 5 volts, and 3.3 volts,
    wherein the electrified vehicle further includes a vehicle body arranged above the first electrical connection layer, and wherein the second and third electrical connection layers are arranged upon the vehicle body.

9. The method of claim 8, wherein the one or more first electrical transmission lines are each connected to a first electrical power source configured to output the first voltage.

10. The method of claim 9, wherein the first electrical power source is a battery system of the vehicle that is also arranged upon the base of the electrified vehicle.

11. The method of claim 10, wherein:
- at least one electrical powertrain component is an electric traction motor configured to propulsion of the electrified vehicle;
- at least one first electrical transmission line includes a rigid busbar arranged substantially parallel to a length of the electrified vehicle; and
- the first voltage is sufficient for powering the electric traction motor.

12. The method of claim 8, wherein the electrical system defines at least two zones corresponding to outlying sides or corners of the electrified vehicle, and wherein the electrical system further includes zone controllers for the zones, respectively, wherein each zone controller is configured to control input/output from/to functional devices and sensors associated with the respective zone of the electrified vehicle.

13. The method of claim 8, wherein one or more of the second electrical transmission lines of the second layer is configured to carry data to one or more controllers of the electrified.

* * * * *